(12) United States Patent
Sheehan

(10) Patent No.: US 7,078,623 B1
(45) Date of Patent: Jul. 18, 2006

(54) ELECTRICAL CONDUIT TO JUNCTION BOX CONNECTION SYSTEM

(76) Inventor: Robert K. Sheehan, 1520 Cohasset Ct., Cincinnati, OH (US) 45255

( * ) Notice: Subject to any disclaimer, the term of this patent is extended or adjusted under 35 U.S.C. 154(b) by 0 days.

(21) Appl. No.: 11/291,627

(22) Filed: Nov. 30, 2005

(51) Int. Cl.
*H02G 3/06* (2006.01)

(52) U.S. Cl. ............... 174/65 R; 174/135; 174/65 SS; 174/153 G; 174/152 G; 285/149.1; 248/56

(58) Field of Classification Search ............ 174/65 R, 174/153 G, 152 G, 65 SS, 153 R, 151, 50, 174/53, 58, 57, 135; 439/92, 93, 94, 95, 439/96, 108, 101, 609, 938, 98; 16/2.1, 2.2; 138/177, 103, DIG. 11, 155; 285/149.1; 248/56; D13/152

See application file for complete search history.

(56) References Cited

U.S. PATENT DOCUMENTS

| | | | |
|---|---|---|---|
| 377,506 A | 2/1888 | Whiter |
| 1,049,283 A | 12/1912 | Westphal |
| 1,131,399 A | 3/1915 | McGinley |
| 1,355,450 A | 10/1920 | Carlson |
| 2,241,293 A | 5/1941 | Campbell |
| 2,457,235 A | 12/1948 | Hoehn |
| 2,466,504 A | 4/1949 | Stoyer |
| 2,973,212 A | 2/1961 | Rose |
| 3,788,582 A | 1/1974 | Swanquist |
| 3,981,061 A | 9/1976 | Jackson et al. |
| 4,151,363 A | 4/1979 | Nichols |
| 4,641,863 A | 2/1987 | Shemtov |
| 4,699,217 A | 10/1987 | McLennan et al. |
| 4,711,974 A | 12/1987 | Borsh |
| 5,200,575 A | 4/1993 | Sheehan |
| 6,140,582 A | 10/2000 | Sheehan |
| 6,231,088 B1 | 5/2001 | Balthazard et al. |
| 6,511,099 B1 | 1/2003 | Bartholoma et al. |

*Primary Examiner*—Angel R. Estrada
(74) *Attorney, Agent, or Firm*—David J. Dawsey; Michael J. Gallagher; Gallagher & Dawsey Co., LPA

(57) ABSTRACT

An electrical conduit to junction box connection system is designed connect conduit to junction boxes. The system incorporates a compression nut and a body. The body includes a box engagement region, a nut engagement region, and a conduit engagement region. The box engagement region includes a radially extending leading and follower tab, a root surface, a tab centering ledge, and a tab centering flank. The nut engagement region includes a nut engagement region thread that cooperates with the compression nut. The conduit engagement region includes a conduit compression system. During installation, the leading tab is inserted into the knockout. An edge of the knockout is positioned in contact with the root surface. The body is reoriented which positions the follower tab inside the junction box. The compression nut is manipulated to compress the junction box between the compression nut and the leading and follower tabs.

22 Claims, 10 Drawing Sheets

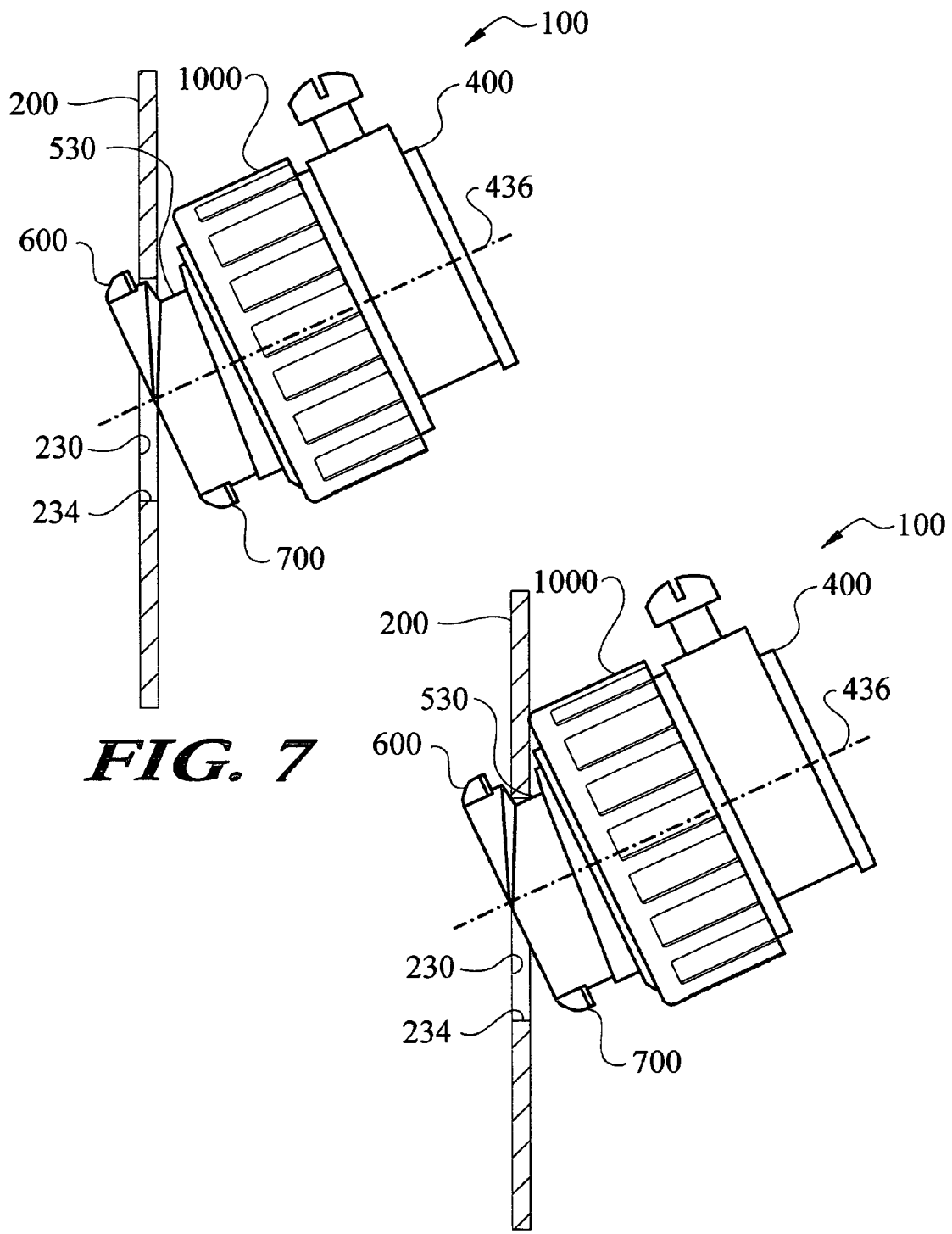

ELECTRICAL CONDUIT TO JUNCTION BOX CONNECTION SYSTEM

TECHNICAL FIELD

The instant invention relates to adapters for connecting electrical conduit to junction boxes, outlet boxes, or other enclosures, and, more particularly, to an electrical conduit connector with a compression nut and a body, that together provide a system for connecting a conduit to a junction box in a quick, safe, and rigid fashion.

BACKGROUND OF THE INVENTION

The most common use for electrical conduit connectors is to facilitate the connection of a conduit or cable to a junction box. The junction box can be a variety of electrical enclosures such as an outlet box, transformer enclosure, circuit panel, lighting fixture—the list is nearly endless. Similarly, the conduit can be rigid or flexible, or could be hose, other tubing capable of routing electrical wire, or cable. Cable can be non-metallic sheathed cable, portable cord, or a variety of other types of electrical conductors. The instant invention is equally successful in connecting a plurality of types of conduits, cables, and other electrical conductors to a wide variety of boxes and other enclosures. Therefore, as used in this specification, the term conduit is not limited to standard rigid electrical conduit, but shall be intended to mean any type of conduit, any type of cable, or any other type of electrical conductor. Many commercial and residential buildings have electrical installations with many types of conduit-to-junction-box connections that utilize electrical connectors.

The two most common types of electrical connectors used are a snap-in connector, and a multipart connector which may be composed of two or more components that utilizes a threaded male end in conjunction with a threaded female locknut, hereinafter referred to collectively as a two-part locknut connector, without intent to limit such connectors to two parts only. In the case of the two-part locknut connector, the male threaded end is inserted into the junction box through a knockout. A rigid connection is established by threading the lock nut onto the male end in the junction box interior. The snap-in connector is another commonly used connector which utilizes a snap ring to quickly connect it to the junction box. Either type of connector is integrated with an adapter end which allows the attachment of conduit, cable, or a variety of types of hollow tubing.

The installation of electrical systems is generally expensive as an electrician must first install the enclosures, route conduit between each enclosure, and install connectors and then pull all necessary electrical wiring through the conduit. In other words, installation is expensive because it is labor intensive. The commercially available electrical connectors are one factor accentuating the labor intensiveness. Two-part locknut connectors increase the cost of installing electrical systems for a number of reasons.

The current art two-part locknut connectors are plagued with labor intensive problems. First, the two-part locknut connectors are shipped from the manufacturer preassembled. That is, the electrician must first remove the locknut from the male end before it can be installed. Once the male end of the connector is placed through the knockout, the electrician must rethread the locknut onto the connector from the interior of the junction box. Two hands are required to disassemble and then reassemble the connectors in the knockout. Consequently, it is difficult to hold a tool or a piece of conduit while reassembling the connector. Once the locknut is threaded it must be tightened. In accordance with many building codes and safety regulations, connectors must be firmly and reliably attached to junction boxes. To properly tighten the two-part locknut connector, the electrician must use a tool, usually a set of pliers or a screwdriver. Occasionally, when the proper tool is unavailable, an electrician will use any object within reach. These situations, while rare, raise serious safety issues. In many instances, however, to "get the job done" the locknut is "finger" tightened. Those persons skilled in the art know that finger tightened two-part locknut connectors can eventually loosen, and a loose connector can cause great strain to be put onto the electrical wires and their connections resulting in an increase in the probability of an electrical fire or other electrical problems, such as poor grounding.

Secondly, when the electrician disassembles the fitting by taking the locknut off the connector, the locknut can be dropped or misplaced. This can occur when the electrician is in an elevated position, such as, on a scissor lift or on scaffolding because electrical conduit is often installed in out-of-the-way places like in rafters and above ceilings. If the locknut cannot be found, the connector is useless. If the electrician decides to retrieve the dropped locknut, the installation time is prolonged.

A third common problem with the present two-part locknut connectors is the locknut is easily cross threaded onto the male thread. When this occurs, the electrician must usually use a tool to remove the locknut. On occasion, cross threading the locknut will damage the male threads on the connector making it difficult or impossible to reuse the connector. Again, the electrician must spend their time either removing the defective connector or forcing the locknut through the damaged portion of the threads.

A fourth problem with the present two-part locknut connectors is the distance the male end protrudes into the junction box. In some installations, the space inside the enclosure is already minimal. The space limitation becomes an acute problem when an additional connector is installed. The male threaded end protrudes well past the depth of the locknut and may interfere with another connector, the contents of the enclosure, or wiring inside the box. Therefore, in a limited space enclosure, the excess thread must be removed. Typically, the electrician saws off the excess thread, or may clip off some of the receptacle or mounting screws, or completes a combination of space enlarging modifications, all of which prolong installation time and threaten the integrity of the system as designed.

A fifth common problem with the present two-part locknut connectors occurs during disassembly of the connector from the enclosure. Electricians may disassemble an installation for a variety of reasons. The disassembly of the two-part locknut connector is more time consuming than the installation. If the locknut was installed properly, that is, by tightening it with a tool, then the locknut must be removed with a tool. Similar to the installation, if the threads are damaged during disassembly, the connector is useless. Also similar to the installation problems, if the locknut is lost, it must be replaced if the connector is to be used again. If the connector was "modified" during installation because space inside the enclosure was limited, disassembly may be exceedingly difficult or impossible due to the probability that the threads on the male connector have been damaged.

The snap-in connector presents similar problems. However, the most significant problem is that these connectors, in most cases, do not create a rigid connection. Because the snap ring is sized to accept a variety of box wall thickness, it does not rigidly attach to many boxes. The loose fit may cause electrical continuity problems, a highly dangerous situation, since the box, the conduit, and the connector are intended to be part of the electrical grounding system in some applications.

Another problem with the snap ring devices is that they are inherently not liquid tight. As is commonly known in the industry, liquid tight refers to the connector's propensity to prohibit liquids from penetrating through the connector and into the junction box. Many applications require the connections of the conduit to the electrical enclosures to be impervious to any liquids found in the surrounding environment, whether the liquid is water, hydraulic fluid, or any other fluid found in industry. In these applications, liquid tight connectors are required for safety purposes, specifically to avoid electrocuting those nearby and to avoid fire. Since, as stated previously, the snap-in connectors do not create a rigid connection, they cannot be confidently utilized in liquid tight applications.

There remains an unfulfilled need to provide a generally universal connector which can be installed quickly and easily without tools, does not require access to the interior of the junction box, and does not need to be disassembled before connecting it to an electrical enclosure. Additionally, there remains an unfulfilled need to provide a generally universal connector providing a rigid; and where required by code, an electrically conductive connection; conserves space within the enclosure; and can be made to be liquid tight.

SUMMARY OF INVENTION

In its most general configuration, the present invention advances the state of the art with a variety of new capabilities and overcomes many of the shortcomings of prior devices in new and novel ways. In its most general sense, the present invention overcomes the shortcomings and limitations of the prior art in any of a number of generally effective configurations. The instant invention demonstrates such capabilities and overcomes many of the shortcomings of prior methods in new and novel ways.

The electrical conduit to junction box connection system of the instant invention is designed to be installed quickly and easily without tools, does not require access to the interior of the junction box, and does not need to be disassembled before connecting it to a junction box. Additionally, the instant invention improves safety because it provides a rigid connection, it conserves space within the enclosure, and it can be made to be liquid tight.

The instant invention connects a conduit to a junction box. Typically, the junction box has a number of prefabricated holes each of which is called a knockout. To insert any connector to the junction box, the knockouts must be exposed by knocking out a cover piece. Alternatively, some junction boxes do not have removable covers for exposing prefabricated knockouts. In this situation the knockout is cut in the desired location with a punch and die set or a drill bit.

The electrical conduit to junction box connection system of the instant invention includes a body and a compression nut. The body has a body interior surface. The body interior surface defines an inlet diameter and an outlet diameter. The outlet diameter is coaxial with the inlet diameter. In an embodiment of the instant invention, a conduit stop projects from the body interior surface a conduit stop projection distance. The distance that the conduit can be inserted into the body is limited by the conduit stop and is called a conduit insertion distance. Furthermore, the body is composed of three regions.

The first region is a box engagement region. The box engagement region is positioned at one end of the body and cooperates with the knockout to attach the body to the junction box. The box engagement region has a leading and a follower tab which extend radially from the box engagement region. Also, within the box engagement region is a root surface. The root surface facilitates the connection of the system to the junction box. The root surface has a root surface diameter that is not coaxial with the body inlet or the body outlet diameter. The leading tab has a perimeter edge, a centering ledge, and a centering flank. The leading tab centering flank extends from the root surface to the leading tab centering ledge. A flank angle exists between the leading tab centering flank and the leading tab centering ledge. The flank angle is between approximately ninety-one degrees and approximately one hundred and seventy-nine degrees. The follower tab also has a perimeter edge and a primary contact surface. The leading tab perimeter edge and the follower tab perimeter edge form a tab perimeter diameter. The perimeter diameter is larger than the knockout diameter.

The second region is a nut engagement region which has a plurality of threads that cooperate with the compression nut. The third region is a conduit engagement region. The conduit engagement region has a conduit compression system for frictionally gripping or clamping the conduit thereby securing the conduit within the body.

The compression nut is another primary component of the system. The compression nut operates to rigidly fix the body to the junction box by compressing the junction box wall between the leading and follower tabs and the compression nut. The compression nut has an exterior surface which can be designed to accept tools or be shaped to allow operation by hand. In either case, operation of the compression nut is accomplished on the outside of the junction box—the electrician is not required to thrust tools or their hand inside the junction box. The compression nut will forcibly engage the exterior surface of the junction box, with or without tools, thereby providing the desired rigid, space saving, and liquid tight connection.

The design of the electrical conduit to junction box connection system facilitates the connection of the conduit to the junction box for running electrical wiring and the like to proceed quickly and easily. Consequently, users will realize substantial labor cost savings versus assembly with prior art systems. Initially, the leading tab is inserted from the outside of the box through the knockout by angling the body such that the central axis is not orthogonal to the knockout. Once the leading tab is on the inside of the junction box, the knockout edge is brought into contact with the root surface. The central axis is oriented orthogonally to the knockout while holding the knockout edge in contact with the root surface. In this manner the follower tab clears the knockout edge and passes through the knockout into the junction box. At this point both the leading and follower tabs are on the inside of the junction box. The body is drawn tight to the junction box by rotating the compression nut so that the nut contact edge presses against the box exterior surface. In one embodiment, the compression nut and nut engagement region threads are left-handed threads, that is, reverse from the normal orientation, to enhance effectiveness of the system. By continuing to rotate the compression nut, the nut contact edge forces the knockout edge onto the leading tab centering flank. Further rotation of the compression nut pushes the knockout edge onto the leading tab centering ledge, substantially centering the body into the knockout and compressing the junction box between the compression nut and the leading and follower tabs. The system is disconnected from the junction box by reversing the above operation.

Once the body is secured to the junction box through the knockout, the conduit is attached to the system by inserting the conduit leading edge into the conduit engagement region. In one embodiment of the instant invention, the conduit leading edge is inserted into the conduit engagement region to the conduit stop. In another embodiment, the conduit compression system frictionally secures the conduit to the body. In those embodiments in which there is no conduit stop, as in, by way of example and not limitation, those embodiments designed to hold flexible cable, where the cable is simply inserted through the body into the connector to an adequate depth to assure a firm grip by the connector on the cable. The electrical wires or cables may pass through the conduit, through the body interior surface, and into the junction box.

The system of the instant invention enables a significant advance in the state of the art. The instant invention is, in addition, widely applicable to a large number of applications. The various embodiments, as would be understood by one skilled in the art, would be suitable to any application requiring the joining of conduit to electrical junction boxes of various types. These variations, modifications, alternatives, and alterations of the various preferred embodiments may be used alone or in combination with one another, as will become more readily apparent to those with skill in the art with reference to the following detailed description of the preferred embodiments and the accompanying figures and drawings.

BRIEF DESCRIPTION OF THE DRAWINGS

Without limiting the scope of the present invention as claimed below and referring now to the drawings and figures:

FIG. 7 is an elevation view of components of an embodiment of the electrical conduit to junction box connection system, not to scale, illustrating a first step in the insertion of a body into a junction box;

FIG. 8 is an elevation view of components of an embodiment of the electrical conduit to junction box connection system, not to scale, illustrating a further step in the insertion of a body into a junction box;

DETAILED DESCRIPTION OF THE INVENTION

The electrical conduit to junction box connection system (100) of the instant invention enables a significant advance in the state of the art. The preferred embodiments of the device accomplish this by new and novel arrangements of elements and methods that are configured in unique and novel ways and which demonstrate previously unavailable but preferred and desirable capabilities. The detailed description set forth below in connection with the drawings is intended merely as a description of the presently preferred embodiments of the invention, and is not intended to represent the only form in which the present invention may be constructed or utilized. The description sets forth the designs, functions, means, and methods of implementing the invention in connection with the illustrated embodiments. It is to be understood, however, that the same or equivalent functions and features may be accomplished by different embodiments that are also intended to be encompassed within the spirit and scope of the invention.

Figure 1:
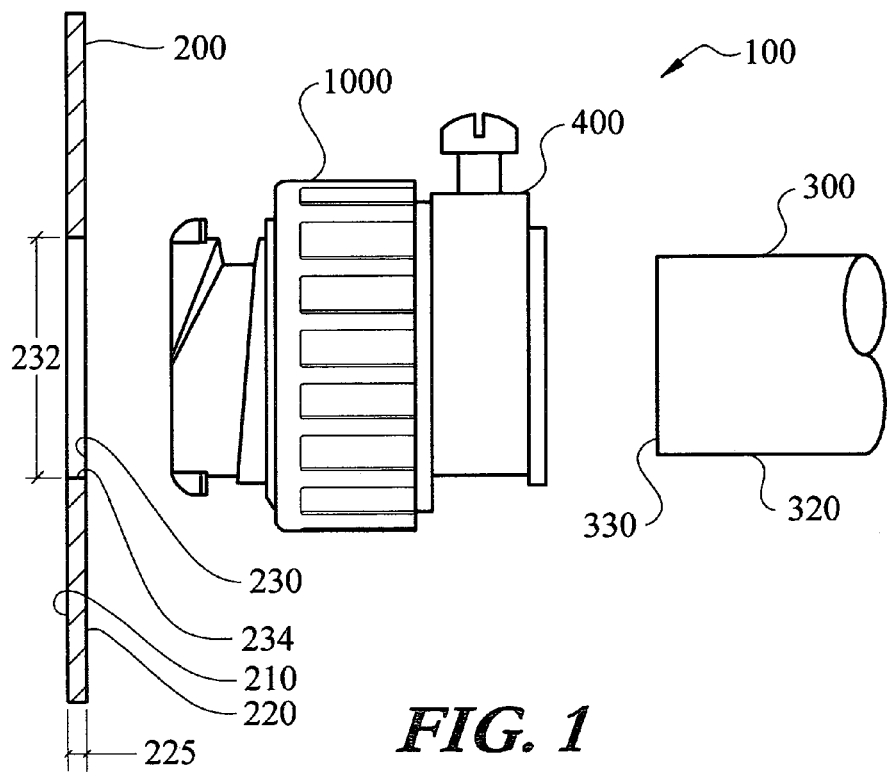
FIG. 1 is an elevation view of an embodiment of the electrical conduit to junction box connection system, not to scale.

An electrical conduit to junction box connection system (100) is designed to quickly, safely, and rigidly connect to a junction box (200) to facilitate the connection of a conduit (300) to the junction box (200). The instant invention is equally successful in connecting a plurality of types of conduits (300), cables, and other electrical conductors to a wide variety of boxes (200). Therefore, as used in this specification, the term conduit is not limited to standard rigid electrical conduit, but shall be intended to mean any type of conduit, any type of cable, or any other type of electrical conductor. The junction box (200) is one of many types of electrical enclosures, such as, outlet and fixture boxes, enclosures for disconnect switches and motor starters, and transformer enclosures. The junction box (200) may be made from steel, plastic, or other commercially feasible and acceptable materials. Referring to FIG. 1, the junction box (200) has a box interior surface (210), a box exterior surface (220), and a box thickness (225). Typically, the junction box (200) has a plurality of prefabricated holes each of which is covered with a plate or is formed with a thin area in the junction box (200) commonly called a knockout (230). To insert a connector to the junction box (200), the knockout (230) must be exposed by knocking out the cover piece or perforating the thin area. Alternatively, some junction boxes (200) do not have removable covers or thin areas that can be prepped to receive a connector. In this situation, knockouts (230) are cut in the desired location with a punch and die set. In either the prefabricated or on-site-cutting box design, the knockout (230) has a knockout diameter (232) and a knockout edge (234). The conduit (300) may be rigid or flexible conduit, or any type of hollow tubing commonly used in electrical installations. The conduit (300) may be made from steel, plastic, or other commercially feasible and acceptable material. The conduit (300) has a conduit interior surface (310), a conduit exterior surface (320), a conduit thickness (340), and a conduit leading edge (330), as seen generally in FIGS. 1 and 2. The two primary components will be briefly described so the operation of the system (100) may be explained.

The electrical conduit to junction box connection system (100) includes a body (400) and a compression nut (1000). As seen generally in FIGS. 1–3, the body (400) has a distal end (410), a proximal end (420), a body interior surface (430), and a body exterior surface (450). The body interior surface (430) defines an inlet diameter (432) and an outlet diameter (434). The outlet diameter (434) is coaxial with the inlet diameter (432). A central axis (436) intersects the outlet and inlet diameters (434,432) midpoints. In one embodiment of the instant invention, a conduit stop (438) projects from the body interior surface (430) a conduit stop projection distance (440). The conduit stop (438) limits the distance that the conduit leading edge (330) can extend into the body (400). The body (400) may be formed a variety of materials including, but not limited to, zinc, plastic, steel, aluminum, and iron, or a combination thereof. In addition, and depending on the type of material, the body (400) may be cast, pressed, machined from stock, injection molded, or manufactured by other common processes utilized for manufacturing electrical connectors. Furthermore, the body (400) is composed of three regions: namely, a box engagement region (500), a nut engagement region (800), and a conduit engagement region (900).

Figure 2:
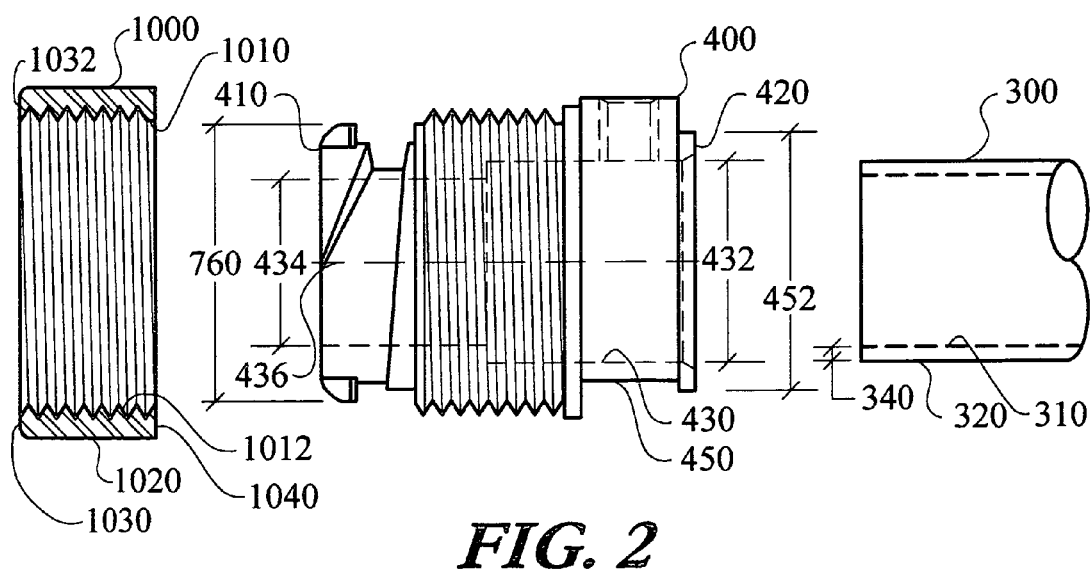
FIG. 2 is an elevation view of components of an embodiment of the electrical conduit to junction box connection system, not to scale, showing a compression nut separated from a body for clarity.
Figure 3:
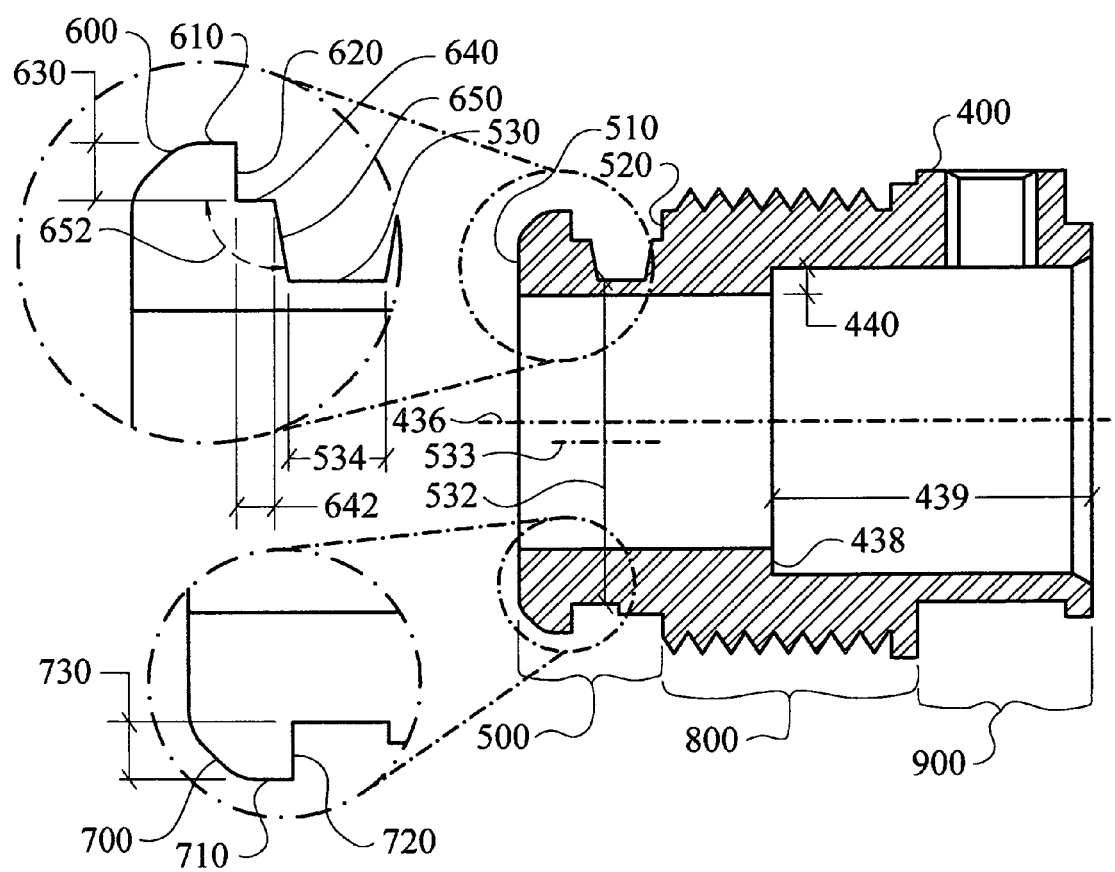
FIG. 3 is a cross-sectional view of components of an embodiment of the electrical conduit to junction box connection system, not to scale, with exploded views of both a leading tab and a follower tab.

With continued reference to FIGS. 1–3, the box engagement region (500) is positioned at the distal end (410) of the body (400) and cooperates with the knockout (230) to attach the body (400) to the junction box (200). The box engagement region (500) has a leading edge (510), a secondary edge (520), a root surface (530), a leading tab (600) and a follower tab (700). The leading tab (600) and the follower tab (700) are located between the leading edge (510) and the secondary edge (520) and extend radially outward. The leading tab (600), the root surface (530), and the follower tab (700) will be described more below.

The leading tab (600) has a leading tab perimeter edge (610), a leading tab primary contact surface (620), a leading tab centering ledge (640), and a leading tab centering flank (650), as seen in FIG. 3. The leading tab (700) extends radially a leading tab height (630) from leading edge (510). The leading tab centering flank (650) extends from the root surface (530) to the leading tab centering ledge (640). A flank angle (652) exists between the leading tab centering flank (650) and the leading tab centering ledge (640). The leading tab centering ledge (640) has a ledge width (642) which is the maximum width of the leading tab centering ledge (640) as measured from the intersection of the leading tab centering ledge (640) with the leading tab centering flank (650) and the intersection of the leading tab centering ledge (640) and the leading tab primary contact surface (620). The flank angle (652) is between approximately ninety-one degrees and approximately one hundred and seventy-nine degrees. The functioning of the leading tab centering ledge (640), the leading tab centering flank (650) oriented at the flank angle (652), as explained more fully below, imparts a desired self-centering feature of the body (400) in the knockout (230) and eases assembly. In one embodiment of the present invention, the distance from leading tab primary contact surface (620) to the body distal end (410) is greater than 150% of the box thickness (225), and the ledge width (642) is substantially equal to or less than the box thickness (225). This relationship provides a minimum protrusion into the interior of the box (200) while simultaneously enhancing the structural strength of the tabs (600,700) and the centering of the body (400) in the knockout (230).

The root surface (530) defines a root surface diameter (532) having a root surface central axis (533) that is offset from the central axis (436), as seen in FIG. 3. In an embodiment of the invention, the root surface (530) a minimum root surface width (534) which is defined as a distance from the box engagement region secondary edge (520) to the nearest intersection of the root surface (530) and the leading tab centering flank (650). The functioning of the root surface (530) during assembly will be described in greater detail below.

Figure 15:
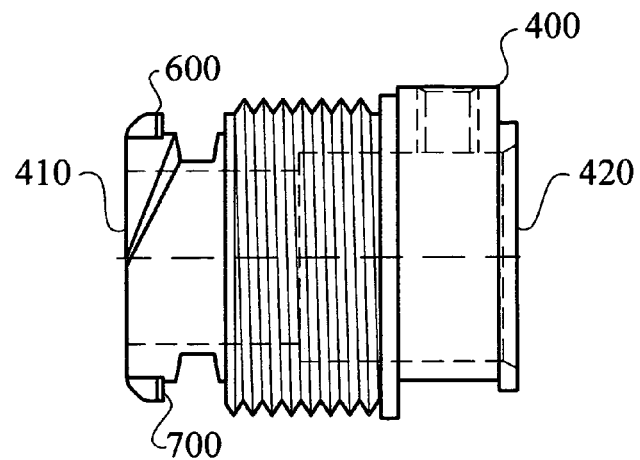
FIG. 15 is an elevation view of components of an embodiment of the electrical conduit to junction box connection system, not to scale.
Figure 16:
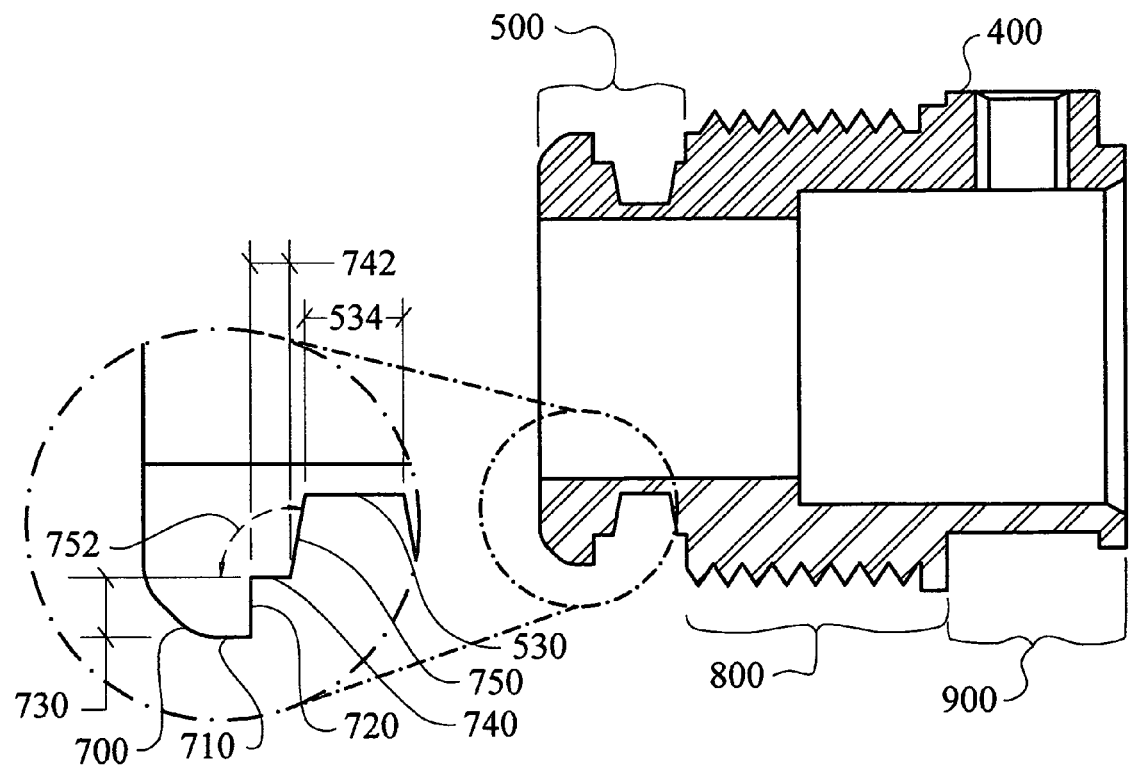
FIG. 16 is a cross-sectional view of components of an embodiment of the electrical conduit to junction box connection system, not to scale.

With continued reference to FIG. 3, the follower tab (700) also has a perimeter edge (710) and a primary contact surface (720). The leading tab (700) extends radially a leading tab height (730) from the box engagement region leading edge (510). The leading tab perimeter edge (610) and the follower tab perimeter edge (710) form a tab perimeter diameter (760), as shown in FIG. 2. The tab perimeter diameter (760) is larger than the knockout diameter (232) to permit the body (400) to be secured to the junction box (200). In another embodiment of the present invention the follower tab (700) has a follower tab centering ledge (740) and a follower tab centering flank (750) which extends from the root surface (530) to the follower tab centering ledge (740), as seen in FIGS. 15 and 16. A follower tab flank angle (752) exists between the follower tab centering flank (750) and the follower tab centering ledge (740). The follower tab centering ledge (740) has a follower tab ledge width (742) which is the maximum width of the follower tab centering ledge (740) as measured from the intersection of the follower tab centering ledge (740) with the follower tab centering flank (750) and the intersection of the follower tab centering ledge (740) and the follower tab primary contact surface (720). The follower tab flank angle (752) is between approximately ninety-one degrees and approximately one hundred and seventy-nine degrees.

Figure 4:
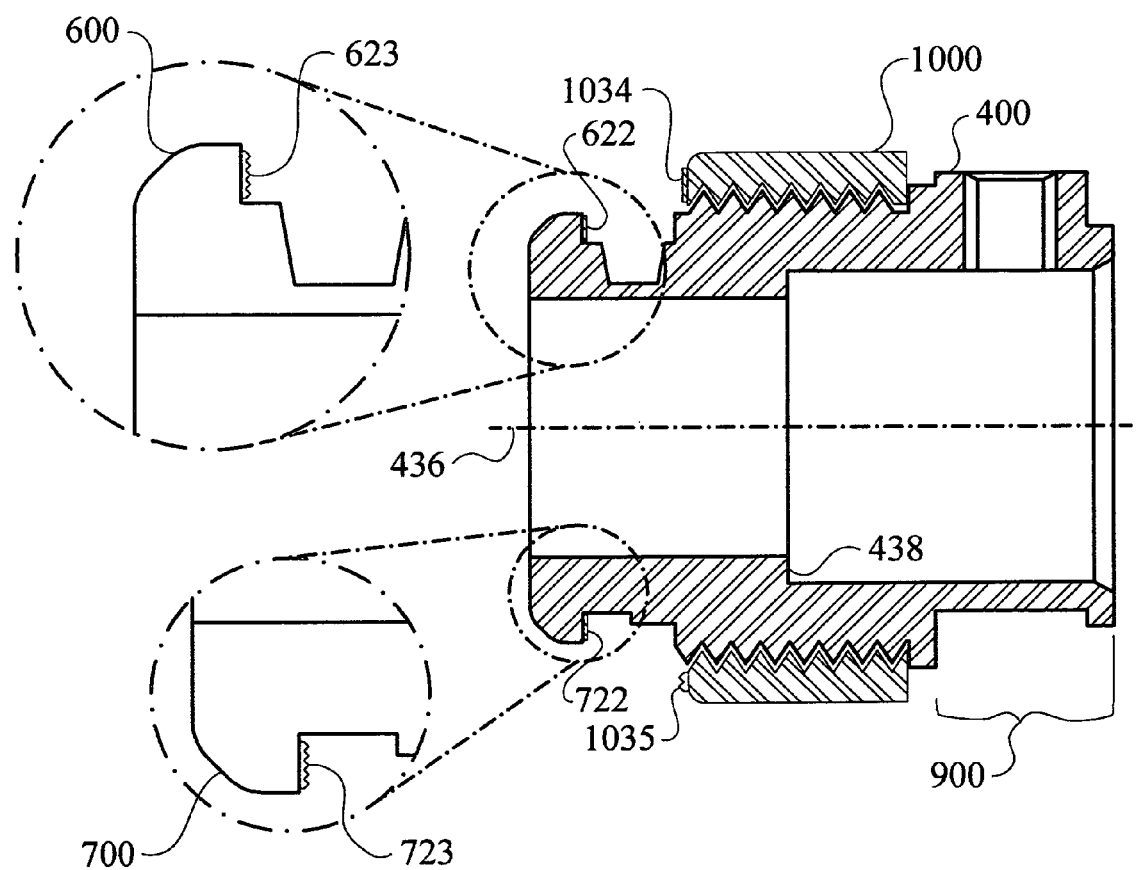
FIG. 4 is a cross-sectional view of components of an embodiment of the electrical conduit to junction box connection system, not to scale, with exploded views of both a leading tab and a follower tab.

In an embodiment of the invention, as seen in FIG. 4, the leading and follower tab primary contact surfaces (620,720) have grip enhancing features (622,722). The grip enhancing features (622,722) reduce the relative motion between the leading and follower tab primary contact surfaces (620,720) and the box interior surface (210). By way of example only, the grip enhancing features (620,720) may be adhesive, a pressure sensitive adhesive that is activated by removal of a releasable covering, or a rubber-like gasket or o-ring. By improving the interfacial resistance to motion, the body (400) is substantially prevented from rotating thereby improving the resistance of the system (100) to vibration.

In another embodiment of the present invention, the grip enhancing features (622,722) are gripping projections (623, 723), as seen in the exploded views in FIG. 4, and comprise one or more of the group consisting of knurling, checkering, knobs, teeth, texturing of the surface, or a plurality of surface features that come into contact with the box interior surface (210) and increase the frictional forces between the leading and follower tabs (600,700) and the box interior surface (210) substantially preventing rotation of the body (400).

In a preferred embodiment of the present invention, the body (400) has two radially extending tabs, that is, the leading tab (600) and the follower tab (700). However, those skilled in the art will observe and appreciate that a lone leading tab (600) may operate with the root surface (530), or multiple leading tabs (600) in combination with a plurality of follower tabs (700) in operation with the root surface (530) where the tabs (600,700) are positioned in a generally opposing manner will also provide the inventive assembly system of the present invention, as will be more fully explained below.

Figure 5:
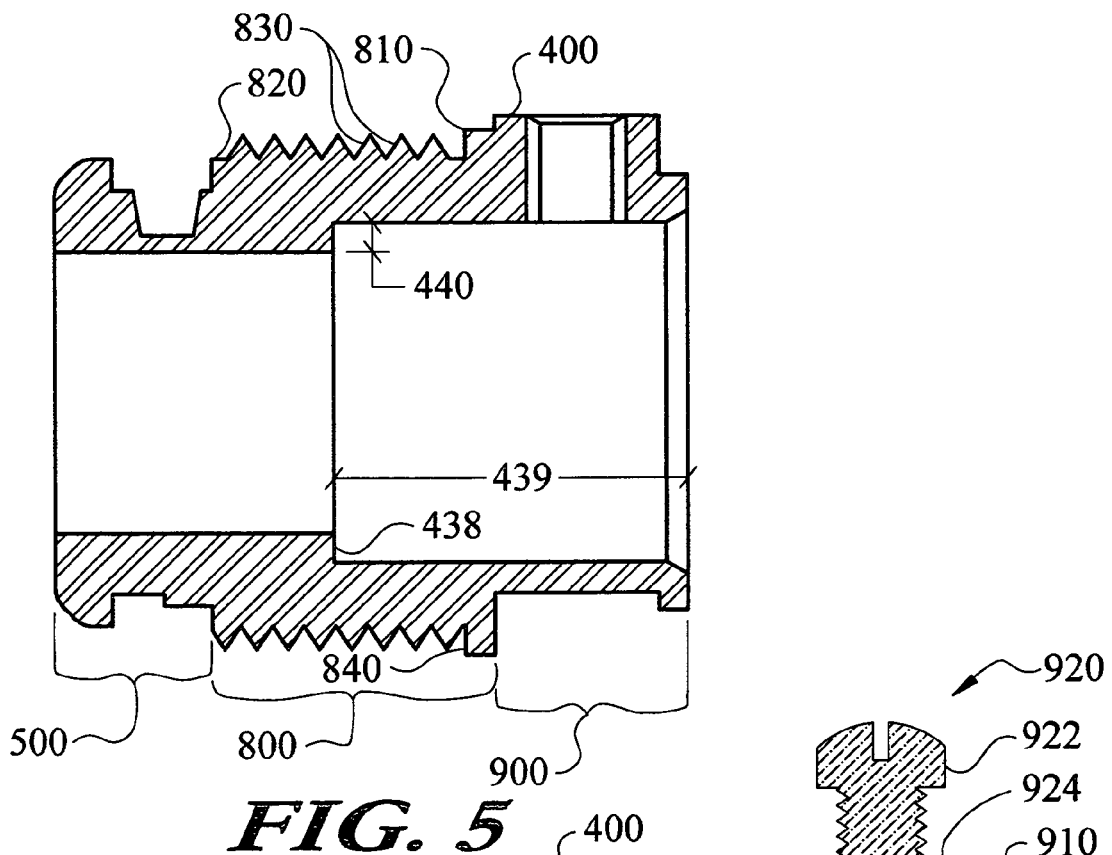
FIG. 5 is a cross-sectional view of components of an embodiment of the electrical conduit to junction box connection system, not to scale.

FIG. 5 shows the nut engagement region (800) which has a nut engagement region proximal end (810), a nut engagement region distal end (820), and a plurality of nut engagement region threads (830). The nut engagement region (800) cooperates with the compression nut (1000), as explained in greater detail below. In an embodiment of the invention, the nut engagement region (800) is formed with a nut stop (840). The nut stop (840) is positioned at the nut engagement region proximal end (810) adjacent to the conduit engagement region (900). The nut stop (840) facilitates the assembly of the system (100) at the factory and removal of the system (100) from the junction box (200) by preventing the compression nut (1000) from being rotated off the body proximal end (420).

Figure 6:
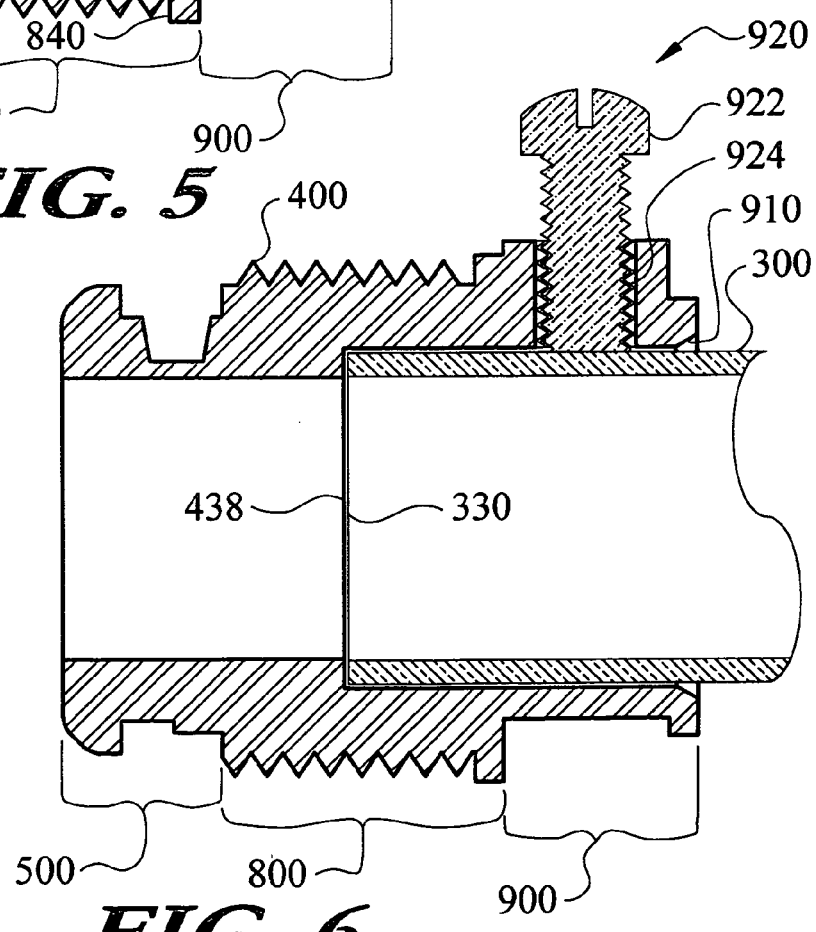
FIG. 6 is a cross-sectional view of components of an embodiment of the electrical conduit to junction box connection system, not to scale, illustrating a conduit compression system.

In one embodiment, the conduit engagement region (900) has a conduit compression system (920) for frictionally securing the conduit (300) within the body (400), as seen in FIG. 6. In an embodiment of the present invention the conduit compression system (920) is a setscrew (922) and a setscrew receiver (924). The setscrew receiver (924) is formed in the conduit engagement region (900) and extends from the body interior surface (430) to the body exterior surface (450). The setscrew (922) is threaded through the setscrew receiver (924). When the conduit (300) is inserted into the body (400) past the setscrew (922) to the conduit stop (438), the setscrew (922) is rotated into engagement with the conduit exterior surface (320) thereby securing the conduit (300) in position. As one skilled in the art would appreciate, the conduit may be secured within the body (400) other than by frictional means, by way of example and not limitation, the solvent welding of suitable materials. A conduit inlet chamfer (910) may be formed in the conduit engagement region (900) to ease initial insertion of the conduit (300) into the body proximal end (420). In an embodiment of the present invention, the body exterior surface (450) at the conduit engagement region (900) defines a body exterior surface inlet diameter (452), as seen in FIG. 2, and the root surface diameter (532) is less than the body exterior surface inlet diameter (452).

Figure 12:
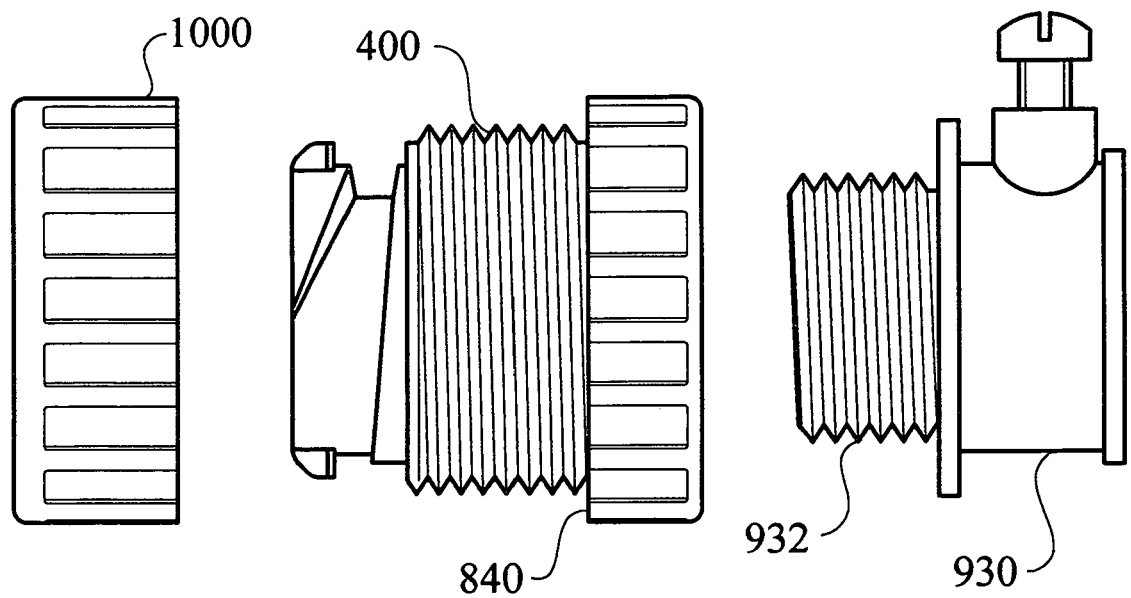
FIG. 12 is an elevation view of components of an embodiment of the electrical conduit to junction box connection system, not to scale.
Figure 13:
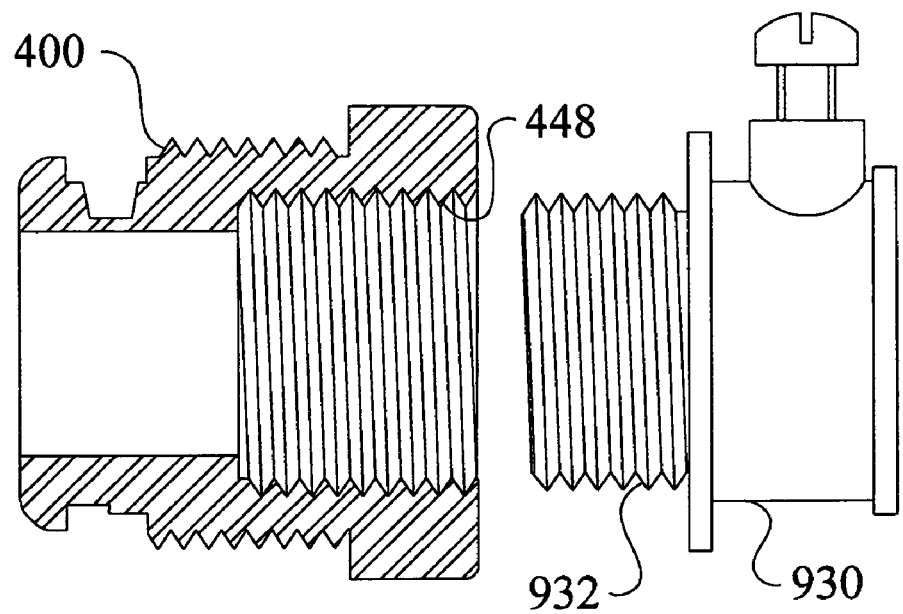
FIG. 13 is a cross-sectional view of components of an embodiment of the electrical conduit to junction box connection system with a removable conduit engagement region, not to scale.
Figure 14:
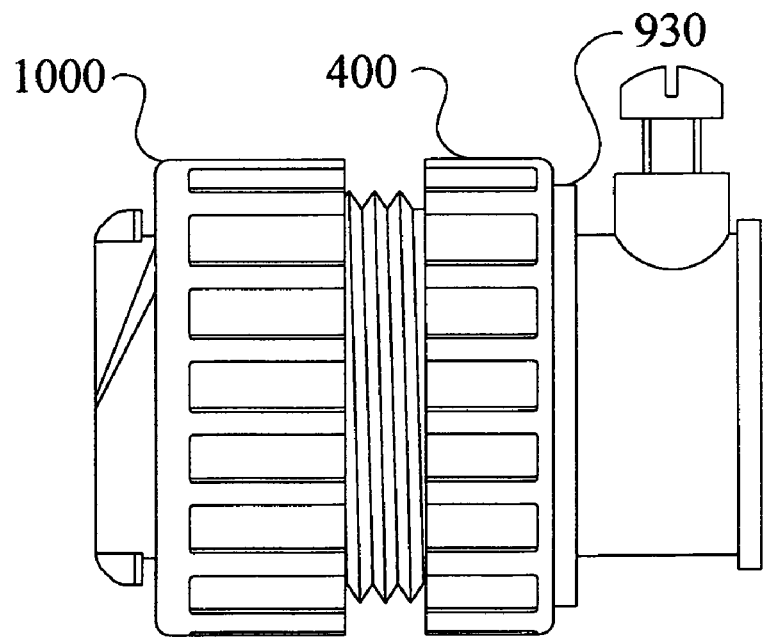
FIG. 14 is an elevation view of components of an embodiment of the electrical conduit to junction box connection system with a removable conduit engagement region, not to scale.

FIGS. 12–14 illustrate an embodiment of the present invention where the conduit engagement region (900) is a removable conduit engagement region (930). As shown in FIGS. 12 and 13, the removable conduit engagement region (930) has a threaded connector (932) for cooperating with the body interior surface (430) having a plurality of internal body threads (448). FIG. 14 illustrates the removable conduit engagement region (930) threaded into the body (400). In this embodiment of the present invention, the removable engagement region (930) may be a commercially available electrical connector without the locknut. Therefore, all of the numerous advantages of the invention, as stated below, are realized by forming the body (400) with the internal body threads (448) which are sized to cooperate with the male threaded end of a prior art electrical connector.

As mentioned above, the electrical conduit to junction box connection system (100) has two primary components—the body (400), as described above, and the compression nut (1000). With reference to FIGS. 1 and 2, the compression nut (1000), which is shown separate from the body (400), has an exterior surface (1020) and a nut interior surface (1010) having a plurality of nut threads (1012) that cooperate with the nut engagement region threads (830). The nut exterior surface (1020) may be formed with texturing to facilitate operation manually or formed with features for cooperating with tools. The compression nut (1000) has a nut free edge (1040) that may butt against the nut stop (840). The nut stop (840), as shown in FIG. 5, prevents the compression nut (1000) from being rotated off the nut engagement region proximal end (810) during assembly following manufacturing or during disassembly of the system (100) from an electrical installation, thus preventing loss of the compression nut (1000). One skilled in the art will appreciate the location of the compression nut (1000) on the body (400) for utilizing the invention in electrical installations. Unlike the two-part locknut connectors found in the prior art, the user does not need to remove the compression nut (1000) prior to installation. Additionally, again unlike the prior art connectors, the compression nut (1000) is easily maneuvered against the box exterior surface (220) without the user placing their hand inside the junction box (200). The compression nut (1000) also has a nut contact edge (1030) having a nut contact surface (1032) for engaging the box exterior surface (220). In an embodiment of the present invention, with reference to FIG. 4, the compression nut contact surface (1032) has a grip enhancing feature (1034) to reduce the relative motion between the compression nut (1000) and the box exterior surface (220) while in contact with one another. By way of example only, the grip enhancing feature may be adhesive, a pressure sensitive adhesive that is activated by removal of a releasable covering, or a rubber-like gasket or o-ring. By increasing the frictional forces, the compression nut (1000) is substantially prevented from unintentionally rotating thereby improving the resistance of the system (100) to vibration. Vibration occurs in many applications, but is especially problematic in industrial environments, where it causes threaded fittings to loosen over time.

In another embodiment of the present invention, the grip enhancing feature (1034) is a gripping projection (1035), as shown in FIG. 4. The gripping projection (1035) comprises one or more of the group consisting of knurling, knobs, checkering, teeth, texturing of the surface, or a plurality of surface features that come into contact with the box exterior surface (220). The gripping projection (1035) increases the frictional forces between compression nut (1000) and the box exterior surface (220) substantially preventing unintentional rotation of the compression nut (1000).

The orientation of the various elements of the system (100) imparts the desired functionality of the system (100). The installation of the system (100) is illustrated in FIGS. 7–11.

Figure 9:
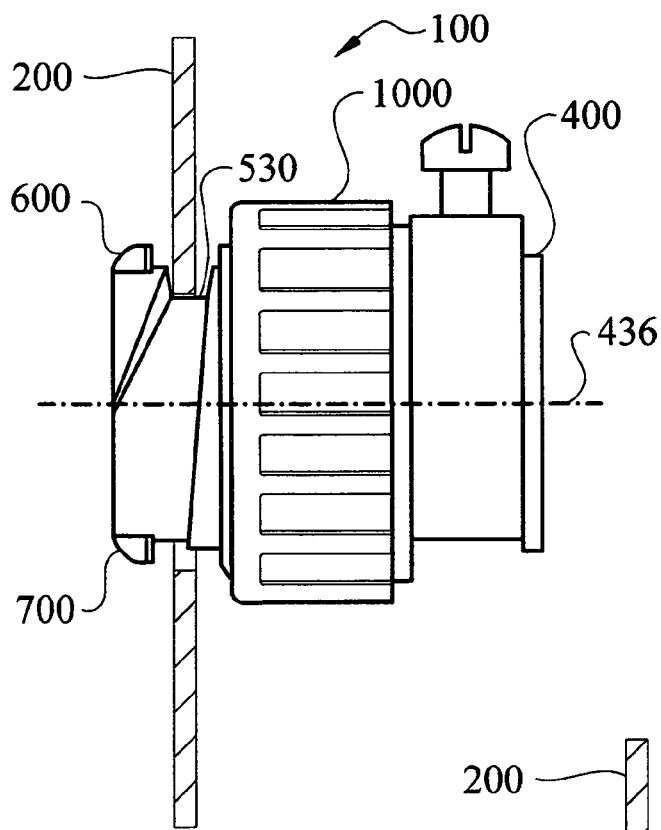
FIG. 9 is an elevation view of components of an embodiment of the electrical conduit to junction box connection system, not to scale, illustrating yet a further step in the insertion of a body into a junction box.

The design of the electrical conduit to junction box connection system (100) allows the installation of the conduit (300) with the junction box (200) for running electrical wiring and the like to proceed quickly and easily, and therefore at substantial labor cost savings, versus prior art connectors. FIG. 7 illustrates that once the knockout (230) is exposed or created, the leading tab (600) is inserted from the outside of the junction box (200) into the knockout (230) by angling the body (400) such that the central axis (436) is not orthogonal to the knockout (230). Once the leading tab (600) is on the inside of the junction box (200), the knockout edge (234) is brought into contact with the root surface (530), as shown in FIG. 8. The central axis (436) is then reoriented orthogonally to the knockout (230) while holding the knockout edge (234) in contact with the root surface (530), as shown in FIG. 9. In an embodiment of the present invention, the root surface central axis (533) is offset from the central axis (436) toward the follower tab (700) by at least 8% to accommodate a larger variation in standard knockout diameters thereby providing for easier installation. During reorientation of the body (400), the follower tab (700) passes through the knockout (230) into the junction box (200). At this point, both the leading and follower tabs (600,700) are on the inside of the junction box (200).

Figure 10:
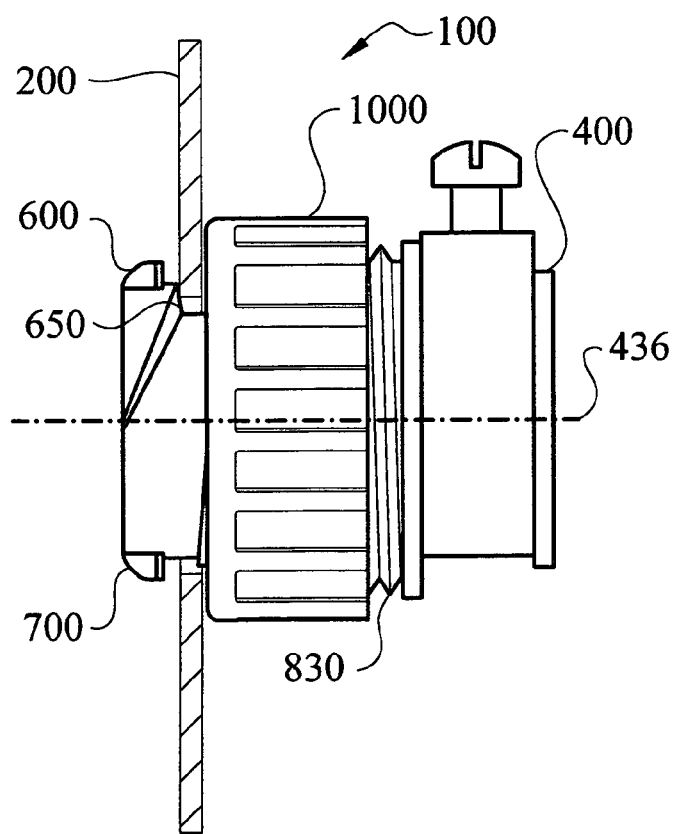
FIG. 10 is an elevation view of components of an embodiment of the electrical conduit to junction box connection system, not to scale, illustrating even yet a further step in the insertion of a body into a junction box.
Figure 11:
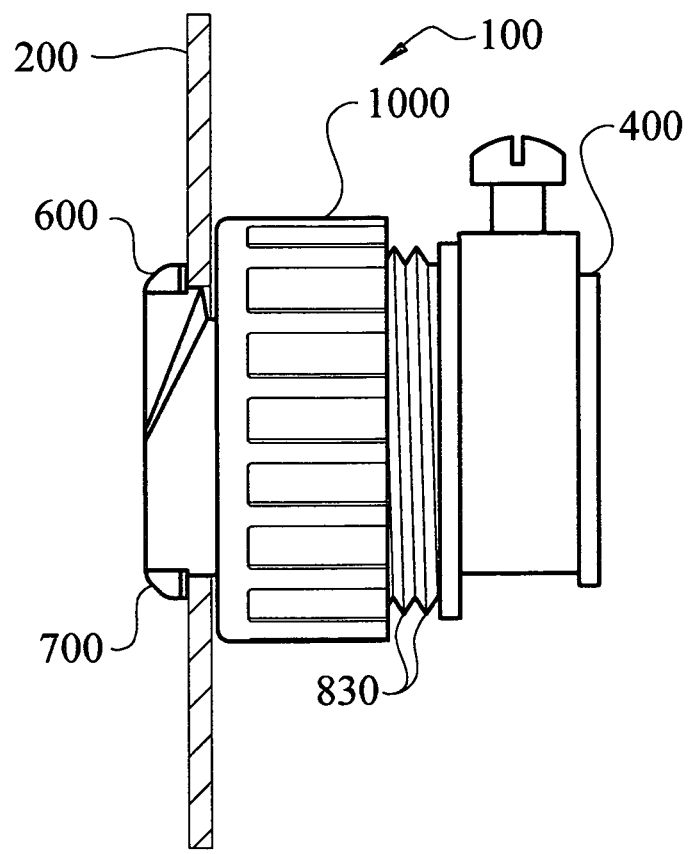
FIG. 11 is an elevation view of components of an embodiment of the electrical conduit to junction box connection system, not to scale, illustrating a final step in the insertion of a body into a junction box.
Figure 17:
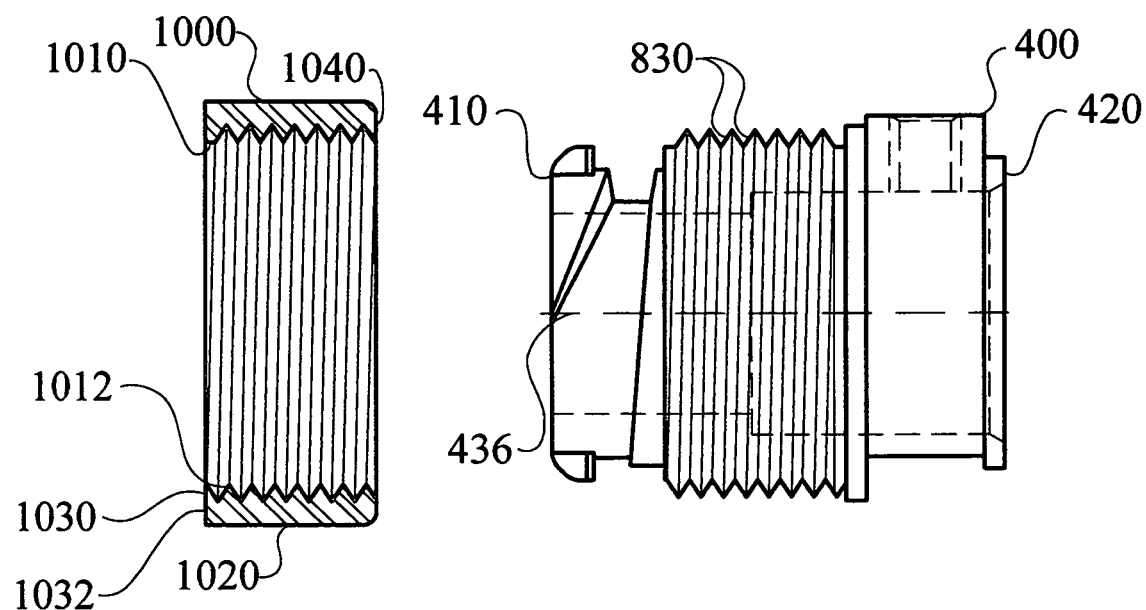
FIG. 17 is an elevation view of components of an embodiment of the electrical conduit to junction box connection system with left-handed threads, not to scale.

The body (400) is drawn tight to the junction box (200), as seen in FIG. 10, by rotating the compression nut (1000) so the nut contact edge (1030) presses against the box exterior surface (220). By continuing to rotate the compression nut (1000), the nut contact edge (1030) forces the knockout edge (234) onto the leading tab centering flank (650). Further rotation of the compression nut (1000) pushes the knockout edge (234) onto the leading tab centering ledge (640), substantially centering the body (400) in the knockout (230), as seen in FIG. 11. Since the tab perimeter diameter (760) is greater than the knockout diameter (232), when the body (400) moves orthogonally away from the junction box (200), the leading tab and follower tab primary contact surfaces (620,720) engage the box interior surface (210). Additional rotation of the compression nut (1000) compresses the junction box (200) between the compression nut contact surface (1032) and the leading and follower tab primary contact surfaces (620,720). Actual tightening can be accomplished by manual manipulation or by application of tools to the nut exterior surface (1020). In an embodiment of the present invention, as seen in FIG. 17, the compression nut (1000) is rotated in the counter-clockwise direction to tighten the compression nut (1000) against the junction box exterior surface (220), that is, the nut threads (1012) advance to the left, commonly referred to as left-handed threads. The left-handed threaded design of the nut engagement region threads (830) and the compression nut threads (1012) is useful for maintaining a tight connection to junction boxes installed on equipment which have clockwise rotational motion. The advantages of the system (100) are readily apparent to those skilled in the art.

First, unlike the two-part locknut or snap-in connectors found in the prior art, by reversing the above installation procedure, the body (400) can be easily removed from the junction box (200) and then later reused. Most importantly, however, the compression nut (1000) remains attached to the body (400). In other words, there is no need to remove the compression nut (1000) to disconnect the body (400) from the junction box (200). The body (400) and the compression nut (1000) remain an integral unit through any number of connections and disconnections. The system (100) may also be easily installed while wearing gloves because the prior art locknut is absent. Those skilled in the prior art know the prior art locknut requires a great degree of tactility to hold and to thread onto the male threaded connector, the difficulty of which is accentuated and prolonged when wearing gloves. So, even in frigid temperatures, to reduce the installation time, electricians generally do not wear gloves to protect their hands. Additionally, the system (100) does not require access to the interior of the junction box (200) to rigidly connect the conduit (300). All connections between the conduit and the junction box (200) can proceed without opening or removing the cover of the junction box (200).

Figure 18:
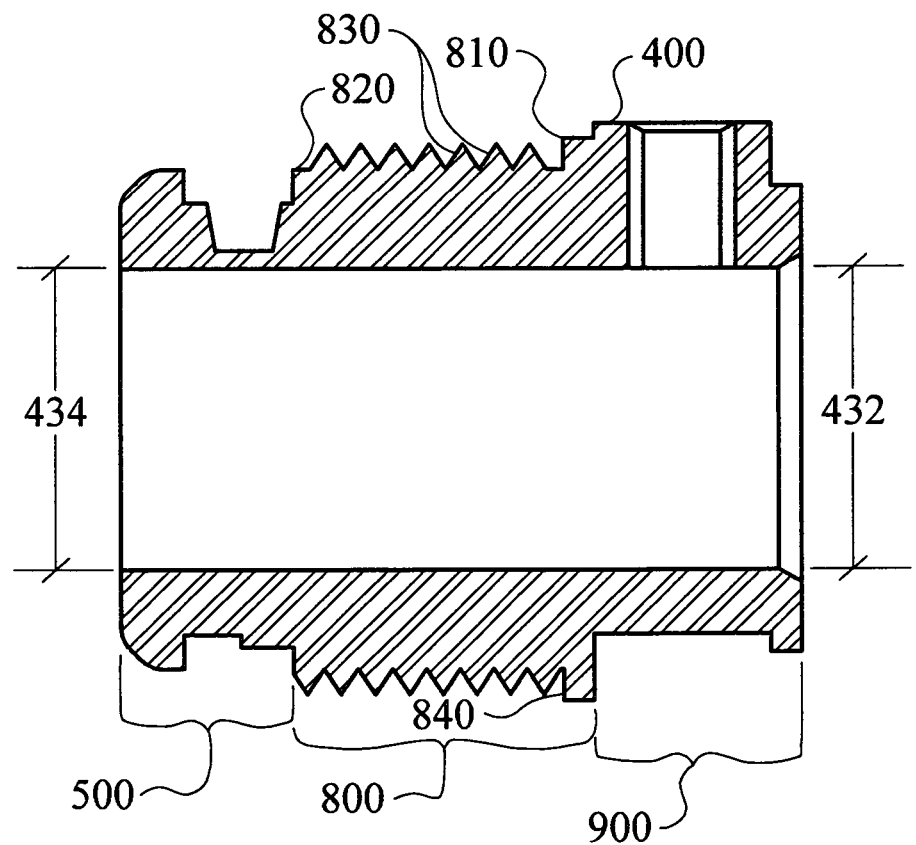
FIG. 18 is a cross-sectional view of components of an embodiment of the electrical conduit to junction box connection system, not to scale.

Once the system (100) is secured to the junction box (200) through the knockout (230), the conduit (300) is attached to the body (400). In an embodiment of the instant invention, as seen in FIG. 6, the conduit (300) is attached to the body (400) by inserting the conduit leading edge (330) to the conduit stop (438). The conduit compression system (920) frictionally secures the conduit (300) to the body (400). A plurality of electrical wires or cables is passed through the conduit (300), through the body interior surface (430), and into the junction box (200). However, as those skilled in the art will appreciate, in an embodiment of the instant invention, seen in FIG. 18, without the conduit stop (438), that is, when the inlet diameter (432) and the outlet diameter (434) are substantially the same and therefore there is no conduit stop projection distance (440) to be reasonably measured, the conduit (300) may be inserted through the body (400) into the junction box (200), or at least inserted through the body (400) to an adequate depth to assure a firm grip by the conduit engagement region (900) on the conduit (300) or cable. This embodiment may be suitable for passing flexible cable, portable cord and the like into the junction box (200).

Numerous alterations, modifications, and variations of the preferred embodiments disclosed herein will be apparent to those skilled in the art and they are all anticipated and contemplated to be within the spirit and scope of the instant invention. For example, although specific embodiments have been described in detail, those with skill in the art will understand that the preceding embodiments and variations can be modified to incorporate various types of substitute and or additional or alternative materials, relative arrangement of elements, and dimensional configurations. Accordingly, even though only few variations of the present invention are described herein, it is to be understood that the practice of such additional modifications and variations and the equivalents thereof, are within the spirit and scope of the invention as defined in the following claims. The corresponding structures, materials, acts, and equivalents of all means or step plus function elements in the claims below are intended to include any structure, material, or acts for performing the functions in combination with other claimed elements as specifically claimed.

I claim:

1. An electrical conduit to junction box connection system for releasably connecting a junction box and a conduit, wherein the junction box has a box interior surface, a box exterior surface, a box thickness, and is formed with a knockout extending from the box interior surface to the box exterior surface having a knockout diameter and a knockout edge, and the conduit has a conduit interior surface, a conduit exterior surface, a conduit thickness, and a conduit leading edge, comprising:

a body having a distal end, a proximal end, a body exterior surface, and a body interior surface, wherein the body interior surface defines an inlet diameter, an outlet diameter that is coaxial with the inlet diameter, and wherein the body includes a box engagement region that cooperates with the junction box, a nut engagement region, and a conduit engagement region that cooperates with the conduit, wherein:

(a) the box engagement region has a leading edge and a secondary edge, with a root surface, a leading tab, and a follower tab located between the leading edge and the secondary edge, wherein:

(i) the root surface defines a root surface diameter that is not coaxial with the body inlet diameter or the body outlet diameter;

(ii) the leading tab has a leading tab perimeter edge, a leading tab primary contact surface, a leading tab centering ledge, and a leading tab centering flank extending from the root surface to the leading tab centering ledge at a flank angle, measured from the leading tab centering ledge to the leading tab centering flank, that is between approximately ninety-one degrees and approximately one hundred and seventy-nine degrees;

(iii) the follower tab has a follower tab perimeter edge and a follower tab primary contact surface, wherein the leading tab perimeter edge and the follower tab perimeter edge define a tab perimeter diameter that is larger than the knockout diameter;

(b) the nut engagement region has a nut engagement region proximal end, a nut engagement region distal end, and a plurality of nut engagement region threads; and (c) the conduit engagement region has a conduit compression system that frictionally secures a portion of the conduit within the body; and a compression nut having a nut interior surface having a plurality of nut threads that cooperate with the nut engagement region threads, a nut exterior surface, a nut contact edge having a nut contact surface, and a nut free edge, wherein after insertion of the leading tab and the follower tab through the knockout by angling the body such that a central axis is not orthogonal to the knockout and then passing the leading tab through the knockout and bringing the knockout edge in contact with the root surface so that the follower tab can pass through the knockout, the body is drawn tight to the junction box by rotating the compression nut such that cooperation of the nut threads and the nut engagement region threads force the compression nut toward the leading tab and the follower tab so that the leading tab centering flank directs the knockout edge onto the leading tab centering ledge thereby substantially centering the central axis in the knockout and pinching the junction box between the compression nut and the leading tab and follower tab thus releasably securing the body to the junction box.

2. The electrical conduit to junction box connection system of claim 1, further including a conduit stop that projects from the body interior surface a conduit stop projection distance thereby limiting the distance that the conduit leading edge can extend into the body.

3. The electrical conduit to junction box connection system of claim 1, wherein the root surface diameter has a root surface central axis that is offset from the central axis by at least 8% of the tab perimeter diameter.

4. The electrical conduit to junction box connection system of claim 3, wherein the offset is toward the follower tab.

5. The electrical conduit to junction box connection system of claim 1, wherein the distance from the leading tab primary contact surface to the body distal end is greater than 150% of the box thickness and the leading tab centering ledge has a ledge width which is substantially equal to or less than the box thickness.

6. The electrical conduit to junction box connection system of claim 1, wherein the root surface has a minimum root surface width which is the smallest distance between the box engagement region secondary edge and an intersection between the leading tab centering flank and the root surface and where the minimum root surface width is at least 150% of the box thickness.

7. The electrical conduit to junction box connection system of claim 1, wherein the follower tab has a follower tab centering ledge and a follower tab centering flank extending from the root surface to the follower tab centering ledge at a flank angle, measured from the follower tab centering ledge to the follower tab centering flank, that is between approximately ninety-one degrees and approximately one hundred and seventy-nine degrees, and wherein the body is drawn tight to the junction box by rotating the compression nut such that cooperation of the nut threads and the nut engagement region threads force the compression nut toward the leading tab and the follower tab so the follower tab centering flank directs the knockout edge onto the follower tab centering ledge thereby substantially centering the central axis in the knockout and pinching the junction box between the compression nut and the leading tab and follower tab thus releasably securing the body to the junction box.

8. The electrical conduit to junction box connection system of claim 1, wherein the nut contact edge has a grip enhancing feature such that when the nut contact edge forcibly engages the box exterior surface the grip enhancing feature keeps the compression nut in contact with the box exterior surface by substantially preventing rotation of the compression nut.

9. The electrical conduit to junction box connection system of claim 8, wherein the grip enhancing feature is a gripping projection.

10. The electrical conduit to junction box connection system of claim 1, wherein the leading tab primary contact surface has a leading tab grip enhancing feature and the follower tab primary contact surface has a follower tab grip enhancing feature so when the leading tab primary contact surface and the follower tab primary contact surface come into contact with the box interior surface, the leading tab grip enhancing feature and the follower tab grip enhancing feature substantially prevent rotation of the body.

11. The electrical conduit to junction box connection system of claim 10, wherein the leading tab grip enhancing feature is a leading tab gripping projection, and the follower tab grip enhancing feature is a follower tab gripping projection.

12. The electrical conduit to junction box connection system of claim 10, wherein (a) the leading tab grip enhancing feature is a leading tab gripping projection, and the follower tab grip enhancing feature is a follower tab gripping projection, and when the leading tab grip enhancing feature and the follower tab grip enhancing feature come into contact with the box interior surface, the frictional forces between the box interior surface and the leading tab and the follower tab are generally improved;

(b) the compression nut has a gripping projection that contacts the box exterior surface, which increases the frictional forces between the box exterior surface and the compression nut; and (c) the leading tab gripping projection, the follower tab gripping projection, and the compression nut gripping projection substantially prevent the compression nut and the body from rotating relative to one another thereby keeping the body rigidly attached to the junction box.

13. The electrical conduit to junction box connection system of claim 1, wherein the conduit compression system is a setscrew cooperating with a setscrew receiver, formed in the conduit engagement region, extending from the body interior surface to the body exterior surface where the conduit leading edge is inserted into the body proximal end past the setscrew receiver so that when the setscrew is rotated through the setscrew receiver, the setscrew contacts the conduit exterior surface rigidly holding the conduit to the body.

14. The electrical conduit to junction box connection system of claim 2, wherein the conduit stop is located a conduit insertion distance from the proximal end and the conduit insertion distance is at least 50% of the distance from the distal end to the proximal end.

15. The electrical conduit to junction box connection system of claim 2, wherein the outlet diameter is smaller than the inlet diameter by at least 50% of the conduit thickness.

16. The electrical conduit to junction box connection system of claim 15, wherein the body exterior surface at the conduit engagement region defines a body exterior surface inlet diameter and the root surface diameter is less than the body exterior surface inlet diameter.

17. The electrical conduit to junction box connection system of claim 1, wherein the body interior surface has a plurality of internal body threads and the conduit engagement region has a removable conduit engagement region having a threaded connector that cooperates with the internal body threads.

18. The electrical conduit to junction box connection system of claim 1, wherein the nut engagement region threads and the compression nut threads are left handed threads.

19. The electrical conduit to junction box connection system of claim 1, wherein the nut engagement region includes a nut stop at the nut engagement region proximal end to prevent travel of the compression nut toward the conduit engagement region beyond a predetermined location.

20. The electrical conduit to junction box connection system of claim 2, wherein the conduit stop projection distance is between approximately 25% and approximately 100% of the conduit thickness.

21. An electrical conduit to junction box connection system for releasably connecting a junction box and a conduit, wherein the junction box has a box interior surface, a box exterior surface, a box thickness, and is formed with a knockout extending from the box interior surface to the box exterior surface having a knockout diameter and a knockout edge, and the conduit has a conduit interior surface, a conduit exterior surface, a conduit thickness, and a conduit leading edge, comprising:

a body having a distal end, a proximal end, a body exterior surface, a body interior surface, wherein the body interior surface defines an inlet diameter and an outlet diameter that is coaxial with the inlet diameter and wherein the outlet diameter is smaller than the inlet diameter by at least 50% of the conduit thickness, and a conduit stop projects from the body interior surface a conduit stop projection distance, wherein the conduit stop projection distance is between approximately 25% and approximately 100% of the conduit thickness thereby limiting the distance that the conduit leading edge can extend into the body, and wherein the body includes a box engagement region that cooperates with the junction box, a nut engagement region, and a conduit engagement region that cooperates with the conduit, wherein:

(a) the box engagement region has a leading edge and a secondary edge, with a root surface, a leading tab, and a follower tab located between the leading edge and the secondary edge, wherein:

(i) the root surface has a minimum root surface width and the root surface defines a root surface diameter that is not coaxial with the body inlet diameter or the body outlet diameter;

(ii) the leading tab has a leading tab perimeter edge, a leading tab primary contact surface, a leading tab centering ledge, and a leading tab centering flank extending from the root surface to the leading tab centering ledge at a flank angle, measured from the leading tab centering ledge to the leading tab centering flank, that is between approximately ninety-one degrees and approximately one hundred and seventy-nine degrees, wherein the distance from the leading tab primary contact surface to the body distal end is greater than 150% of the box thickness and the leading tab centering ledge has a ledge width which is substantially equal to or less than the box thickness, and wherein, the minimum root surface width, which is the smallest distance between the box engagement region secondary edge and an intersection between the leading tab centering flank and the root surface, is at least 150% of the box thickness;

(iii) the follower tab has a follower tab perimeter edge and a follower tab primary contact surface, wherein the leading tab perimeter edge and the follower tab perimeter edge define a tab perimeter diameter that is larger than the knockout diameter, and the root surface diameter has a root surface central axis that is offset from a central axis by at least 8% of the tab perimeter diameter;

(b) the nut engagement region has a nut engagement region proximal end, a nut engagement region distal end, a plurality of left-handed nut engagement region threads, and a nut stop at the nut engagement region proximal end; and (c) the conduit engagement region has a conduit compression system that frictionally secures a portion of the conduit within the body, wherein the conduit compression system is a setscrew cooperating with a setscrew receiver, formed in the conduit engagement region, extending from the body interior surface to the body exterior surface where the conduit leading edge is inserted into the body proximal end past the setscrew receiver so that when the setscrew is rotated through the setscrew receiver, the setscrew contacts the conduit exterior surface rigidly holding the conduit to the body; and a compression nut having a nut interior surface having a plurality of nut threads where the nut threads are left-handed threads that cooperate with the nut engagement region threads, a nut exterior surface, a nut contact edge having a nut contact surface, and a nut free edge, wherein after insertion of the leading tab and the follower tab through the knockout by angling the body such that the central axis is not orthogonal to the knockout and then passing the leading tab through the knockout and bringing the knockout edge in contact with the root surface so that the follower tab can pass through the knockout, the body is drawn tight to the junction box by rotating the compression nut such that cooperation of the nut threads and the nut engagement region threads force the compression nut toward the leading tab and the follower tab so that the leading tab centering flank directs the knockout edge onto the leading tab centering ledge thereby substantially centering the central axis in the knockout and pinching the junction box between the compression nut and the leading tab and follower tab thus releasably securing the body to the junction box.

22. An electrical conduit to junction box connection system for releasably connecting a junction box and a conduit, wherein the junction box has a box interior surface, a box exterior surface, a box thickness, and is formed with a knockout extending from the box interior surface to the box exterior surface having a knockout diameter and a knockout edge, and the conduit has a conduit interior surface, a conduit exterior surface, a conduit thickness, and a conduit leading edge, comprising:

a body having a distal end, a proximal end, a body exterior surface a body interior surface, wherein the body interior surface defines an inlet diameter and an outlet diameter that is coaxial with the inlet diameter and wherein the outlet diameter is smaller than the inlet diameter by at least 50% of the conduit thickness, and a conduit stop projects from the body interior surface a conduit stop projection distance, wherein the conduit stop projection distance is between approximately 25% and approximately 100% of the conduit thickness thereby limiting the distance that the conduit leading edge can extend into the body, and wherein the body includes a box engagement region that cooperates with the junction box, a nut engagement region, and a conduit engagement region that cooperates with the conduit, wherein:

(a) the box engagement region has a leading edge and a secondary edge, with a root surface, a leading tab, and a follower tab located between the leading edge and the secondary edge, wherein:

(i) the root surface has a minimum root surface width and the root surface defines a root surface diameter that is not coaxial with the body inlet diameter or the body outlet diameter;

(ii) the leading tab has a leading tab perimeter edge, a leading tab primary contact surface, a leading tab centering ledge, and a leading tab centering flank extending from the root surface to the leading tab centering ledge at a flank angle, measured from the leading tab centering ledge to the leading tab centering flank, that is between approximately ninety-one degrees and approximately one hundred and seventy-nine degrees, wherein the distance from the leading tab primary contact surface to the body distal end is greater than 150% of the box thickness and the leading tab centering ledge has a ledge width which is substantially equal to or less than the box thickness, and wherein, the minimum root surface width, which is the smallest distance between the box engagement region secondary edge and an intersection between the leading tab centering flank and the root surface, is at least 150% of the box thickness;

(iii) the follower tab has a follower tab perimeter edge, a follower tab primary contact surface, a follower tab centering ledge, and a follower tab centering flank extending from the root surface to the follower tab centering ledge at a flank angle, measured from the follower tab centering ledge to the follower tab centering flank, that is between approximately ninety-one degrees and approximately one hundred and seventy-nine degrees, wherein the leading tab perimeter edge and the follower tab perimeter edge define a tab perimeter diameter that is larger than the knockout diameter, and the root surface diameter has a root surface central axis that is offset from a central axis by at least 8% of the tab perimeter diameter;

(b) the nut engagement region has a nut engagement region proximal end, a nut engagement region distal end, a plurality of nut engagement region threads, and a nut stop at the nut engagement region proximal end; and (c) the conduit engagement region has a conduit compression system that frictionally secures a portion of the conduit within the body, wherein the conduit compression system is a setscrew cooperating with a setscrew receiver, formed in the conduit engagement region, extending from the body interior surface to the body exterior surface where the conduit leading edge is inserted into the body proximal end past the setscrew receiver so that when the setscrew is rotated through the setscrew receiver, the setscrew contacts the conduit exterior surface rigidly holding the conduit to the body; and a compression nut having a nut interior surface having a plurality of nut threads that cooperate with the nut engagement region threads, a nut exterior surface, a nut contact edge having a nut contact face, and a nut free edge, wherein after insertion of the leading tab and the follower tab through the knockout by angling the body such that the central axis is not orthogonal to the knockout and then passing the leading tab through the knockout and bringing the knockout edge in contact with the root surface so that the follower tab can pass through the knockout, the body is drawn tight to the junction box by rotating the compression nut such that cooperation of the nut threads and the nut engagement region threads force the compression nut toward the leading tab and the follower tab so that the leading tab centering flank directs the knockout edge onto the leading tab centering ledge thereby substantially centering the central axis in the knockout and pinching the junction box between the compression nut and the leading tab and follower tab thus releasably securing the body to the junction box.

\* \* \* \* \*